United States Patent
Choi et al.

(10) Patent No.: US 8,149,865 B2
(45) Date of Patent: Apr. 3, 2012

(54) COGNITIVE RADIO COMMUNICATION TERMINAL AND METHOD FOR DETECTING COLLISION USING FEATURE DETECTION

(75) Inventors: Hyun Ho Choi, Suwon-si (KR); Kyung Hun Jang, Suwon-si (KR); Youngsoo Kim, Seoul (KR); Chan Soo Hwang, Yongin-si (KR); Hyo Sun Hwang, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 286 days.

(21) Appl. No.: 12/400,193

(22) Filed: Mar. 9, 2009

(65) Prior Publication Data

US 2010/0091789 A1 Apr. 15, 2010

(30) Foreign Application Priority Data

Oct. 10, 2008 (KR) ........................ 10-2008-0099798

(51) Int. Cl.
*H04L 12/413* (2006.01)
*H04W 4/00* (2009.01)
(52) U.S. Cl. ........................ 370/447; 370/329
(58) Field of Classification Search .................. 370/329, 370/447
See application file for complete search history.

(56) References Cited

U.S. PATENT DOCUMENTS

| 5,504,750 | A | 4/1996 | Fulghum et al. | |
|---|---|---|---|---|
| 5,936,962 | A | 8/1999 | Haddock et al. | |
| 2007/0147410 | A1* | 6/2007 | Kumar | 370/431 |
| 2009/0040974 | A1* | 2/2009 | Goldhamer | 370/329 |
| 2009/0207894 | A1* | 8/2009 | Nefedov | 375/219 |
| 2010/0061315 | A1* | 3/2010 | Cordeiro | 370/329 |
| 2010/0246442 | A1* | 9/2010 | Wang et al. | 370/254 |
| 2011/0075586 | A1* | 3/2011 | Hu et al. | 370/252 |

FOREIGN PATENT DOCUMENTS

| KR | 10-2003-0033278 | 5/2003 |
|---|---|---|
| KR | 10-2006-0124498 | 12/2006 |
| KR | 10-2007-0011321 | 1/2007 |
| KR | 10-2007-0061317 | 6/2007 |
| KR | 10-2007-0084386 | 8/2007 |

* cited by examiner

*Primary Examiner* — Ricky Ngo
*Assistant Examiner* — Paul Masur
(74) *Attorney, Agent, or Firm* — NSIP Law (57) ABSTRACT

A cognitive radio communication terminal including a transmission processing unit to divide data by a quiet time slot that is allocated at a first point in time of a collision detection period, to transmit at least one portion of the divided data to a reception side, and a sensing unit to determine whether at least one of a feature information and an energy of another terminal is detected in a channel with the reception side during the quiet time slot of the first point in time. Where neither the feature information nor the energy of the other terminal is detected based on a determination of the sensing unit, the transmission processing unit transmits the remaining divided data.

22 Claims, 6 Drawing Sheets

COGNITIVE RADIO COMMUNICATION TERMINAL AND METHOD FOR DETECTING COLLISION USING FEATURE DETECTION

CROSS-REFERENCE TO RELATED APPLICATION

This application claims the benefit under 35 U.S.C. §119 (a) of a Korean Patent Application No. 10-2008-0099798, filed on Oct. 10, 2008, in the Korean Intellectual Property Office, the entire disclosure of which is incorporated herein by reference.

BACKGROUND

1. Field

The following description relates to a cognitive radio communication system. More particularly, the description relates to a cognitive radio communication terminal and method of transmission.

2. Description of Related Art

Much research is currently underway involving technologies that efficiently use limited frequency resources. Cognitive radio ("CR") technology is in the spotlight.

Currently, use of unlicensed devices such as a wireless local area network ("WLAN"), Bluetooth, and the like is increasing. The number of frequency bands and system standards that such unlicensed devices may is are also increasing.

Instead of a centralized cellular communication that may centrally manage and use radio resources, the unlicensed device may adopt a distributed communication protocol where terminals access radio resources to perform communication.

The distributed communication protocol may be easily embodied and have less complexity. However, as the number of terminals in a network increases, a potential collision between the terminals may become serious and thereby deteriorate transmission efficiency. Accordingly, there is a need for a new technology that may adapt to a varying amount of unlicensed devices in a network and enable the unlicensed devices to effectively communicate.

SUMMARY

In one general aspect, a cognitive radio communication terminal includes a transmission processing unit to divide data by a quiet time slot that is allocated at a first point in time of a collision detection period, to transmit at least one portion of the divided data to a reception side, and a sensing unit to determine whether at least one of feature information and an energy of another terminal is detected in a channel with the reception side during the quiet time slot of the first point in time, wherein, where neither the feature information nor the energy of the other terminal is detected based on a determination of the sensing unit, the transmission processing unit transmits the remaining divided data.

Where only the energy of the other terminal is detected in the channel with the reception side based on the determination of the sensing unit, the transmission processing unit may transmit the feature information to the reception side during the collision detection period, and may occupy the channel with the reception side after the collision detection period to transmit the remaining divided data.

Where both the feature information and the energy of the other terminal is detected in the channel with the reception side based on the determination of the sensing unit, the transmission processing unit may suspend transmission of the divided data.

The other terminal may detect the feature information in a quiet time slot, allocated at a second point in time of the collision detection period, to suspend transmission of the data in correspondence to a detection of the feature information.

The first point in time may be temporally prior to the second point in time.

The sensing unit may determine whether at least one of the feature information and the energy is detected in the channel with the reception side using an energy detection scheme or a feature detection scheme in the quiet time slot of the first point in time.

The feature detection scheme may be performed depending on whether at least one feature information among a preamble, a pilot, a signature, and a cyclic prefix is detected in the channel with the reception side.

The transmission processing unit may divide the remaining divided data by a quiet time slot allocated at a third point in time of a subsequent collision detection period, the sensing unit may determine whether at least one of the feature detection and the energy of the other terminal may detect in the channel with the reception side in the quiet time slot of the third point in time, and where neither the feature information nor the energy of the other terminal is detected based on the determination at the third point in time, the transmission processing unit may transmit the remaining divided data at the third point in time.

Where only the energy of the other terminal is detected based on the decision result at the third point in time, the transmission processing unit may transmit the feature information to the channel with the reception side by the subsequent quiet collision period, and may occupy the channel with the reception side after the subsequent collision detection period to transmit the remaining divided data.

Where both the feature detection and the energy of the other terminal is detected based on the decision result at the third point in time, the transmission processing unit may suspend transmission of the divided data.

The other terminal may detect the feature information in a quiet time slot allocated at a fourth point in time of the subsequent collision detection period and may suspend transmission of data in correspondence to detection of the feature information, and the third point in time may be temporally prior to the fourth point in time.

The collision detection period may be divided into a plurality of time slots corresponding to the size of the quiet time slot, and at least one of the time slots may be assigned with a priority order and may be allocated to a particular terminal as a quiet time slot of the particular terminal.

The priority order may correspond to a channel service, and a temporally foreground time slot among the plurality of time slots may be allocated to the particular terminal needing a Quality of Service (QoS) as a top priority.

The cognitive radio communication terminal may further include a receiver to receive an acknowledgement signal from the reception side, where reception of the divided data is completed.

In another general aspect, a cognitive radio communication method for a cognitive radio communication terminal includes transmitting data, suspending transmission of the data at a first point in time of a collision detection period to determine whether at least one of feature information and the energy of another terminal is detected in a channel with a reception side, and resuming transmission of the data where the feature information or the energy of the other terminal is not detected in the channel with the reception side.

Where only the energy of the other terminal is detected in the channel with the reception side, the method may further include transmitting the feature information to the channel with the reception side by the collision detection period; and occupying the channel with the reception side after the collision detection period to transmit the remaining data.

The method may further include suspending transmission of the data where the feature detection and the energy of the other terminal is detected in the channel with the reception side based on the decision result.

The method may further include receiving an acknowledgement signal from the reception side where transmission of the data is completed.

Other features will become apparent to those skilled in the art from the following detailed description, which, taken in conjunction with the attached drawings, discloses exemplary embodiments.

BRIEF DESCRIPTION OF THE DRAWINGS

Throughout the drawings and the detailed description, unless otherwise described, the same drawing reference numerals will be understood to refer to the same elements, features, and structures. The elements may be exaggerated for clarity and convenience.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein will be suggested to those of ordinary skill in the art. Also, descriptions of well-known functions and constructions are omitted to increase clarity and conciseness.

Hereinafter, a cognitive radio communication terminal will be referred to as a general term for terminals that may operate in a distributed network and may, independently, access radio resources and perform communication.

Figure 1:
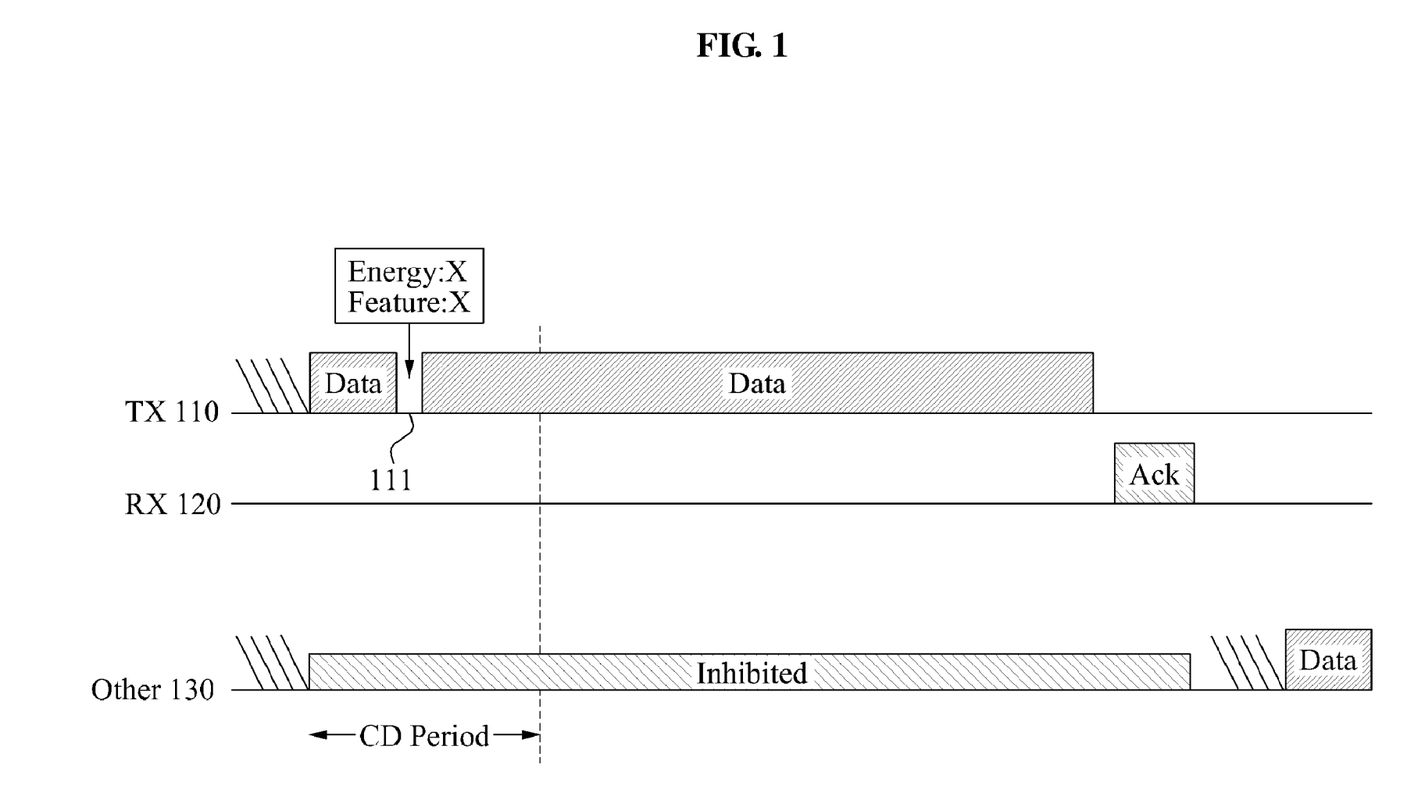
FIG. 1 is a diagram illustrating an exemplary timing method of cognitive radio communication terminals.

FIG. 1 illustrates an exemplary timing method of cognitive radio communication terminals. A transmitting cognitive radio communication terminal ("Tx") 110 may sense whether a channel for transmitting data is available. Where the channel is available, the Tx 110 may access the channel after a delay caused by a random backoff, for example, and initiate a data transmission. The Tx 110 may access the channel using, for example, a conventional carrier sense multiple access/ collision avoidance ("CSMA/CA"). The Tx 110 may be compatible with, but is not limited to, an Institute of Electrical and Electronics Engineers ("IEEE") 802.11 wireless local area network ("WLAN") system.

Referring to FIG. 1, the above initial data transmission may be partially performed during a predetermined collision detection ("CD") period. The initial data transmission may be temporarily suspended during a quiet time slot 111 randomly allocated to a point in time of the CD period. The Tx 110 may perform a collision detection in the channel.

For example, the Tx 110 may partially transmit the data during the CD period, temporarily suspend the data transmission, and then perform the collision detection with another terminal 130. Where the collision with the other terminal 130 is not detected, the Tx 110 may resume the suspended data transmission after the CD period passes. Where a receiving cognitive radio communication terminal ("Rx") 120 receives all the data, the Rx 120 may transmit an acknowledgement signal ("ACK") to the Tx 110 indicating reception of the data is complete.

The Tx 110 may perform the collision detection using an energy detection or a feature detection in the channel. The feature detection may include detection of information associated with at least one of the following features: a preamble, a pilot, a signature, and a cyclic prefix, each of which is predetermined.

For example, as shown in FIG. 1, where neither the energy nor the feature information is detected in the channel, (i.e., Energy: X, Feature: X), it is possible that the channel is available and not in use by the other terminal 130. In such case, the Rx 120 may occupy the channel and resume the suspended transmission of the data after the CD period passes. As another example, where the energy or the feature information is detected in the channel, the other terminal 130 may be using the channel and thus a collision may be predicted.

Figure 2:
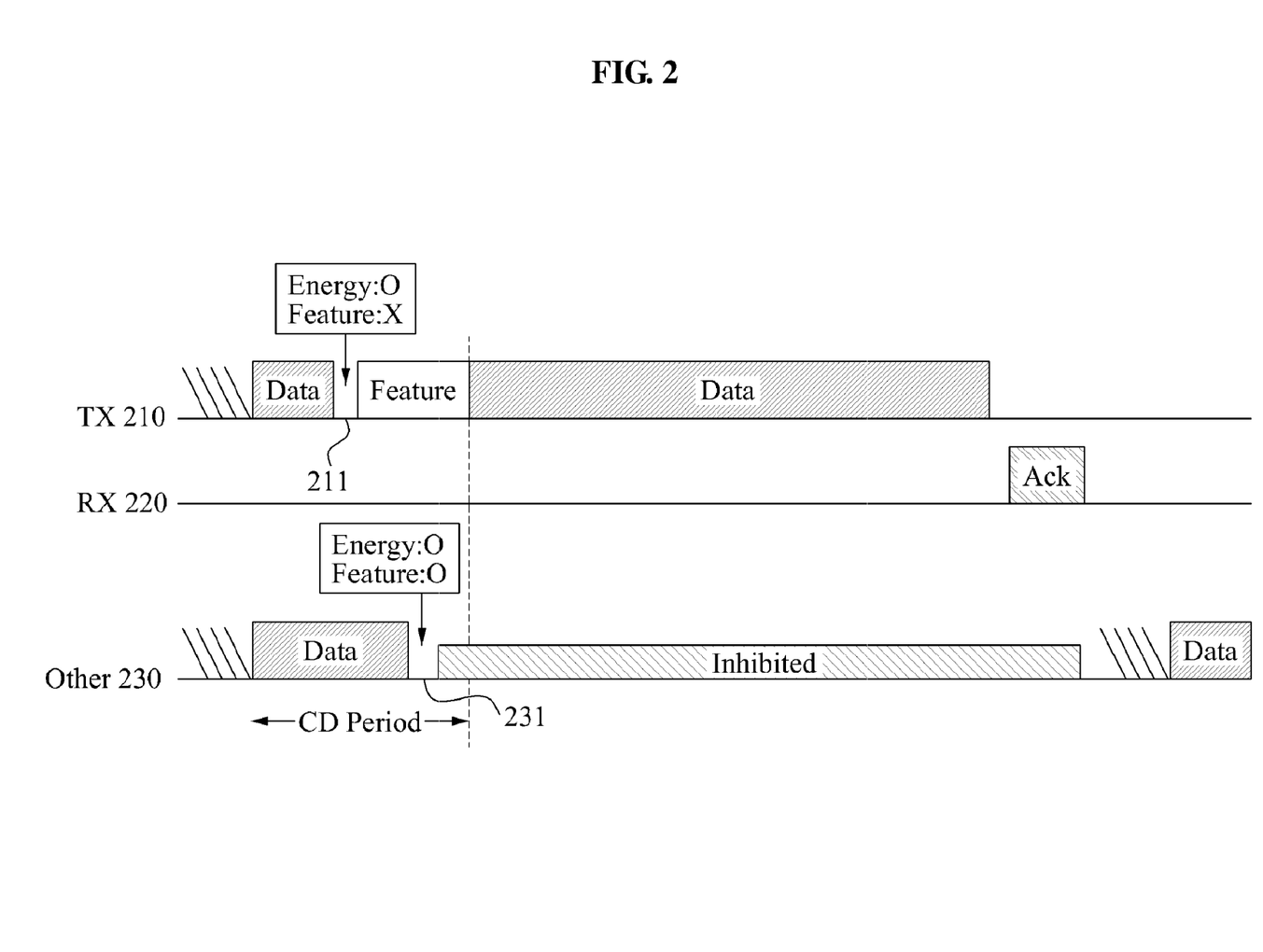
FIG. 2 is a diagram illustrating an exemplary collision detection performed by a cognitive radio communication terminal during a collision detection period.

FIG. 2 illustrates an exemplary collision detection performed by a cognitive radio communication terminal during a collision detection period. A Tx 210 may partially transmit data for a predetermined CD period and temporarily suspend the data transmission during a quiet time slot 211 randomly allocated to a point in time of the CD period and thereby may detect a collision with another terminal 230. In the quiet time slot 211, the other terminal 230 may transmit data using the channel and the Tx 210 may detect the energy in the channel due to the data transmitted by the other terminal 230.

A quiet time slot may be a period that is randomly allocated, among a plurality of time slots, to each terminal for performing the energy detection or the feature detection. The plurality of time slots may be acquired by uniformly dividing the CD period. The quiet time slot may be randomly allocated among the time slots excluding a preamble. Where the energy is detected in the channel in the quiet time slot, the Tx 210 may recognize that the collision occurs in the channel.

For example, the Tx 210 may detect the energy that is transmitted by the other terminal 230 in the channel during the quiet time slot 211. As shown in FIG. 2, since the other terminal 230 does not transmit the feature information, the Tx 210 may detect only the energy. (I.e., Energy: O, Feature: X). Where the detected energy is less than a threshold, the Tx 210 may disregard the detected energy. Where the Tx 210 has initially detected the collision among terminals causing the collision, and thereby may reserve the channel, and where the Tx 210 detects only the energy greater than or equal to the threshold in the channel during the quiet time slot 211, then the Tx 210 may determine a collision occurred in the channel.

Regarding the feature detection, the feature information may include information associated with at least one of a preamble, a pilot, a signature, and a cyclic prefix, each of which are predetermined. The Tx 210 may transmit the feature information only for the CD period. After the CD period passes, or after a delay caused by a backoff time from the termination point during the CD period passes, the Tx 210 may occupy the channel and terminate the data transmission.

A quiet time slot 231 of the other terminal 230 may be allocated after the quiet time slot 211 of the Tx 210. During the quiet time slot 231, due to the data of the Tx 210, the other terminal 230 may detect the energy to be greater than or equal to the threshold and determine a potential collision in the channel. The other terminal 230 also may detect the feature information transmitted by the Tx 210. For example, during the quiet time slot 231, the other terminal 230 may detect both the energy and the feature information in the channel. (I.e., Energy: O, Feature: O).

Where both the energy and the feature information are detected in the channel, the other terminal 230 may determine the potential collision in the channel and also may recognize a terminal that has initially performed the collision detection in the channel. Accordingly, the other terminal 230 may suspend its transmission of the data and concede a radio resource to the terminal that has initially performed the collision detection.

The randomly allocated quiet time slot 231 may be allocated to the other terminal 230 prior to the allocation of the quiet time slot 211 for the Tx 210. In such case, the other terminal 230 may detect only the energy and transmit the feature information where the Tx 210 may detect both the energy and the feature information. After such detection, the Tx 210 may suspend transmission of the data and let the other terminal 230 occupy the radio resource.

A Rx 220 may transmit ACK signal to the Tx 210 indicating that reception of the data is complete.

As described above, where terminals increase in a network, a cognitive radio communication terminal may prevent a potential collision between terminals in a channel and thereby provide effective use of the channel. Also, a cognitive radio communication method may adopt an existing distributed scheme for an initial channel access and a receiving terminal and thereby enable interworking with existing terminals.

Figure 3:
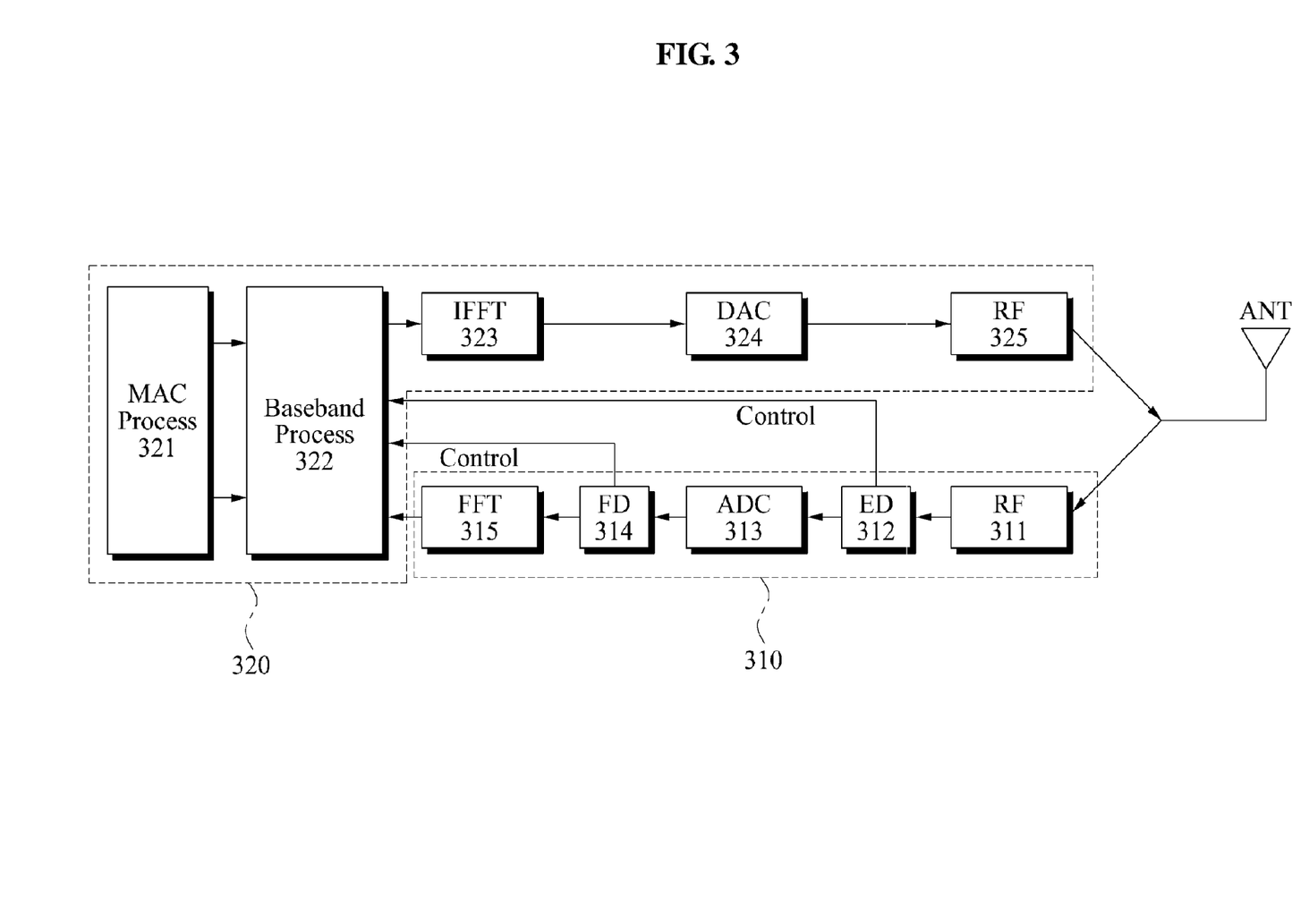
FIG. 3 is a block diagram illustrating an exemplary cognitive radio communication terminal.

FIG. 3 is a block diagram illustrating an exemplary cognitive radio communication terminal. The cognitive radio communication terminal may include a sensing unit 310 and a transmission processing unit 320. The sensing unit 310 may include a radio frequency ("RF") module 311 to receive an RF signal, an energy detection ("ED") module 312 to detect the energy in the received RF signal, an analog-to-digital conversion ("ADC") module 313, a feature detection ("FD") module 314 to detect feature information in a digital output from the ADC module 313, and a fast Fourier transform ("FFT") module 315.

The transmission processing unit 320 may include a Media Access Control ("MAC") process module 321 and a baseband process module 322 in order to perform baseband processing for control information received from the ED module 312 or the FD module 314 and thereby determine an occupancy or non-occupancy. The transmission processing unit 320 may further include an inverse fast Fourier transform ("IFFT") module 323, a digital-to-analog conversion ("DAC") module 324, and an RF module 325 that are generally required to transmit data.

The sensing unit 310 may sense whether the energy or feature information is detected in a channel and thereby determine a potential collision with another terminal. For example, the sensing unit 310 may determine that (1) neither the energy nor the feature information is detected in the channel, (2) both the energy and the feature information are detected in the channel, (3) only the energy is detected in the channel and (4) only the feature information is detected in the channel. However, where only the feature information is detected, it may be a circumstance where the channel is not in use and thus the above situation may have no need to be considered.

In the first case, where neither the energy nor the feature information is detected in the channel, the transmission processing unit 320 may determine there is no waiting terminal to transmit data in a current channel and then may occupy radio resource to resume suspended transmission of the data.

In the second case, where both the energy and the feature information are detected in the channel, the transmission processing unit 320 may recognize a reserved terminal for occupying the channel and then may completely suspend transmission of the data.

In the third case where, only the energy is detected in the channel, the transmission processing unit 320 may recognize the potential collision in the channel due to the detected energy. However, the transmission processing unit 320 may determine the corresponding terminal has initially performed the collision detection in the channel and transmit the feature information to inform the other terminal to abandon use of the channel. After a CD period, the transmission processing unit 320 may occupy the channel and then transmit the remaining divided data. Accordingly, the cognitive radio communication terminal may prevent collision between terminals from occurring in the channel based on the feature information.

Figure 4:
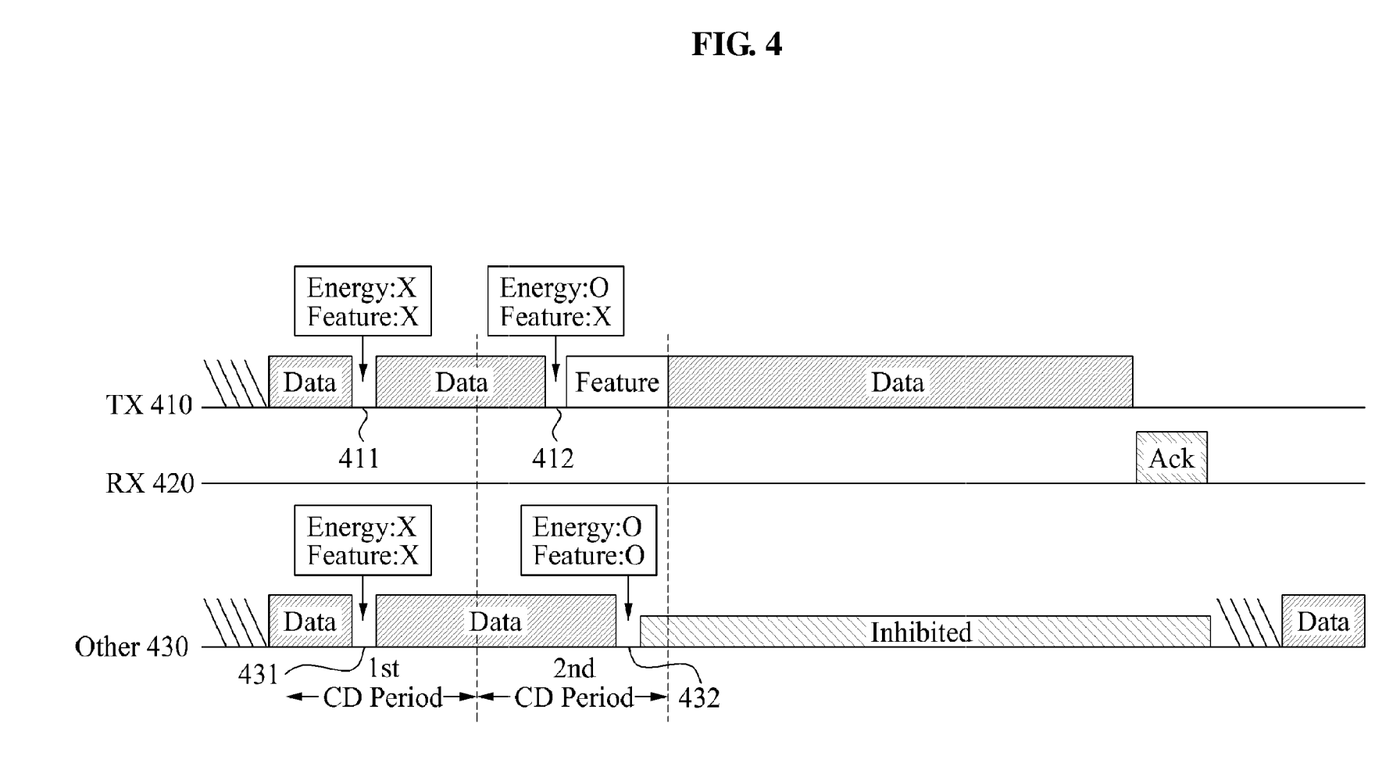
FIG. 4 is a diagram illustrating an exemplary collision detection performed by a cognitive radio communication terminal during a plurality of collision detection periods.

FIG. 4 illustrates an exemplary collision detection performed by a cognitive radio communication terminal during a plurality of collision detection periods. Where the collision detection is performed for a single CD period, a randomly allocated quiet time slot may be simultaneously allocated to two terminals. In such case, the two terminals may recognize a current channel as empty. In order to prevent the two terminals from determining a current channel as empty, the two CD periods are provided and the collision detection is performed in the randomly allocated quiet time slot for each of the CD periods. Accordingly, it is possible to prevent the above problem that may occur due to duplicate of the quiet time slots. A number of CD periods may be determined based on a network credit.

For example, referring to FIG. 4, a Tx 410 may partially transmit data during a first CD period and temporarily suspend transmission of the data during a quiet time slot 411 that is randomly allocated at a point in time during the first CD period and thereby perform an initial collision detection for another terminal 430. Where neither the energy nor feature information is detected, (I.e., Energy: X, Feature: X), the Tx 410 may resume transmission of the data by a point in time of a second CD period followed by the first CD period. The point in time of the second CD period also may be randomly determined. A quiet time slot 412 may be allocated for a collision detection at the point in time of the second CD period.

During the quiet time slot 412, the Tx 410 may temporarily suspend the resumed transmission of the data to thereby perform a subsequent collision detection for the other terminal 430. The Tx 410 may recognize the potential collision with the other terminal 430 in the channel. For example, where two points in time of quiet time slots, randomly selected twice by two terminals respectively, exactly match, that is, where quiet time slots 411 and 431, and 412 and 432 simultaneously match are very rare and thus the Tx 410 may recognize the missed collision of the initial collision detection through the subsequent collision detection.

In the quiet time slot 412 corresponding to a second detection point in time, the Tx 410 may detect the energy of the other terminal 430 to thereby recognize the potential collision in the channel. Since only the energy is detected in the quiet time slot 412, (I.e., Energy: O, Feature: X), the Tx 410 may determine it has initially performed the collision detection in the second collision detection period. The Tx 410 that has initially performed the collision detection may transmit feature information for the second CD period to thereby prevent the other terminal 430 from occupying the channel.

Where the second CD period has passed, the Tx 410 may transmit all the suspended remaining data to a reception side. In view of the other terminal 430, the quiet time slot 431 is selected at the same point in time as the quiet time slot 411 for the first CD period, whereas the quiet time slot 432 is selected at a different point in time from the quiet time slot 412 for the second CD period. In this instance, due to the feature information transmitted by the Tx 410, the other terminal 430 may detect both the energy and feature information. Where both the energy and the feature information are detected, (I.e., Energy: O, Feature: X), the other terminal 430 may suspend transmission of data and later resume transmission of the data from the beginning.

In a systematic aspect of the Tx 410, a transmission processing unit may divide the remaining data by the quiet time slot 412 allocated at the point in time of the second CD period. A sensing unit may determine whether the energy or feature information of the other terminal 430 is detected in the channel in the quiet time slot 412. Where neither the energy nor the feature information is detected, (I.e., Energy: X, Feature: X), the transmission processing unit may transmit the remaining data after the second CD period is terminated. Where both the energy and the feature information are detected, a transmission processing unit may transmit the feature information in the channel with the reception side by the second CD period and may occupy the channel and transmit the remaining data after the second CD period. During a randomly selected quiet time slot of the second CD period, the other terminal 430 may detect the feature information of the transmission processing unit to thereby suspend transmission of the data. Where the feature information is detected, the transmission processing unit may suspend transmission of the data.

A Rx 420 may transmit ACK signal to the Tx 410 indicating that reception of the data is complete.

Figure 5:
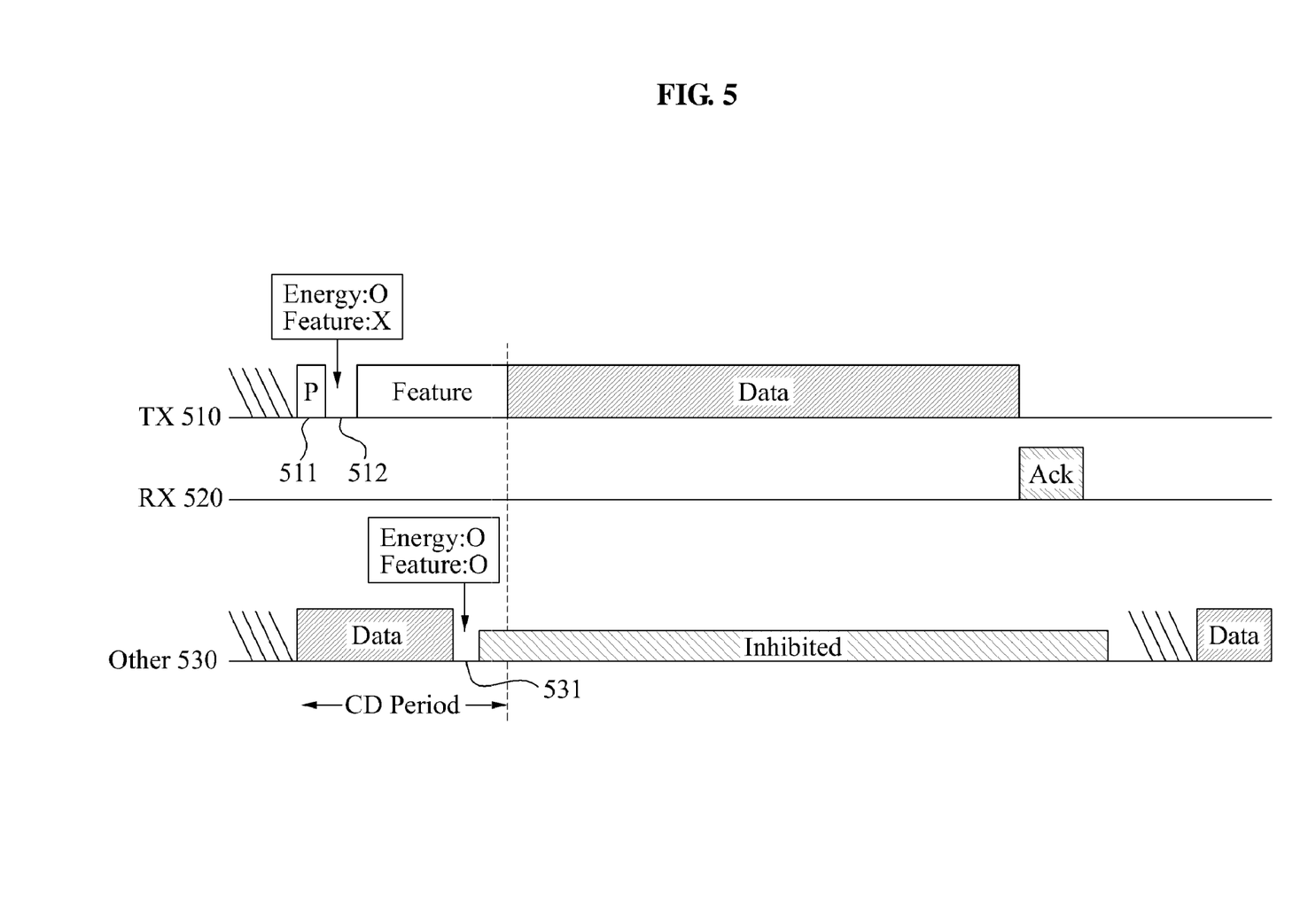
FIG. 5 is a diagram illustrating an exemplary collision detection performed by a cognitive radio communication terminal with an assigned priority.

FIG. 5 illustrates an exemplary collision detection performed by a cognitive radio communication terminal Tx 510 with an assigned priority. A quiet time slot 512 may be allocated to a particular cognitive radio communication terminal Tx 510 prior to other terminals. During the quiet time slot, the particular cognitive radio communication terminal Tx 510 may perform a collision detection to thereby occupy a channel prior to the other terminals Other 530. For example, the particular cognitive radio communication terminal Tx 510 may be applicable to a field needing a Quality of Service ("QoS") as a top priority.

For example, a quiet time slot 531 may be randomly allocated for each terminal for a predetermined CD period. The randomly allocated quiet time slot may be divided into a plurality of time slots where an energy detection time and a feature information detection time is reflected. (I.e., Energy: O, Feature: X; Energy: O, Feature: O). At least one time slot among the plurality of time slots may reflect a priority order and thus be allocated as the quiet time slot of the particular terminal.

A Rx 520 may transmit ACK signal to the Tx 510 indicating that reception of the data is complete.

Figure 6:
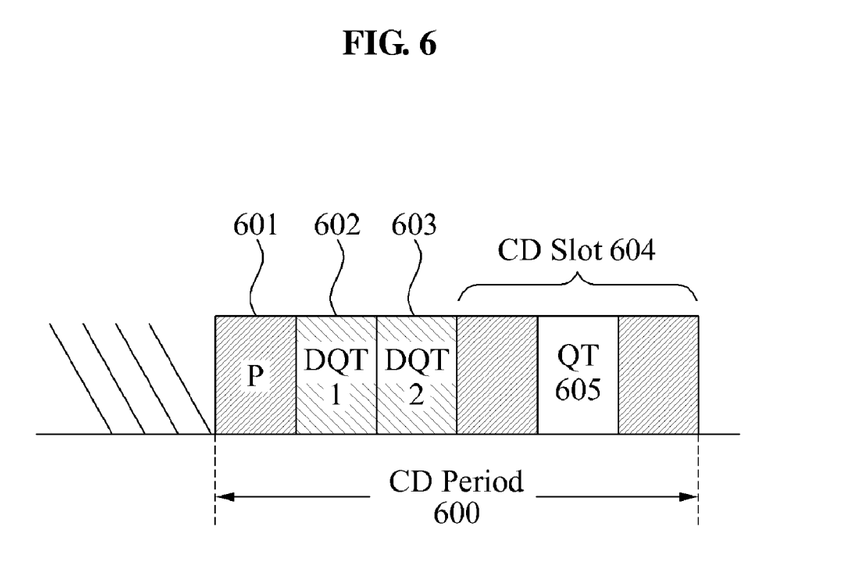
FIG. 6 is a diagram illustrating an exemplary collision detection period having a priority time slot.

FIG. 6 illustrates an exemplary collision detection period having a priority time slot. A CD period 600 may include a plurality of uniformly divided time slots 601, 602, 603, and 604. The CD period 600 may include a preamble region ("P") 601 for frame synchronization, a dedicated quiet time ("DQT1") 602 corresponding to a quiet time slot region having a top priority order, and a ("DQT2") 603 corresponding to a quiet time slot region having a subsequent priority order. The CD period 600 may further include the time slots 604 that are randomly allocated to general terminals in a network. Each of the quiet time slots 604 that include a quiet time slot QT 605 for performing a collision detection may have a priority order and may also be differently allocated according to a terminal feature.

For example, the temporally foreground DQT1 602 among the quiet time slots excluding the preamble slot 601 may be allocated to a particular terminal needing a QoS as a top priority. The particular terminal may perform a collision detection in the channel in the allocated DQT1 602. The particular terminal may occupy radio resource prior to other terminals. A terminal that is allocated with the DQT2 603 may occupy the channel next to the particular terminal allocated with the DQT1 602.

Figure 7:
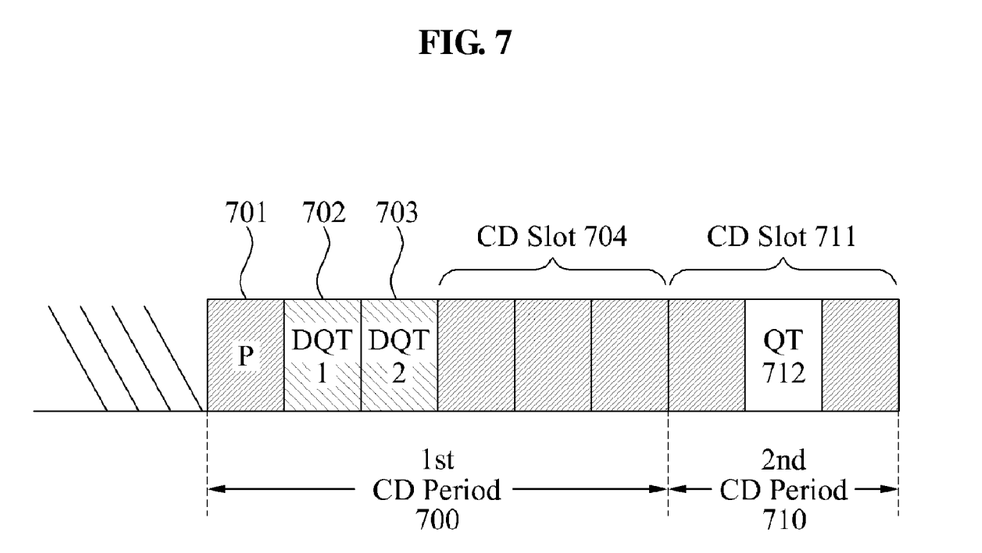
FIG. 7 is a diagram illustrating an example of a plurality of collision detection periods each having a priority time slot.

FIG. 7 illustrates an example of a plurality of collision detection periods each having a priority time slot. A first CD period 700 may correspond to the CD period 600 of FIG. 6. A terminal may detect a collision in a channel in a particular time slot among the remaining quiet time slots excluding a preamble slot ("P") 701 for the first CD region period 700. As described above with reference to FIG. 6, a first terminal having a top priority may be allocated with a DQT1 702 and thus may perform a collision detection prior to other terminals in the DQT1 702. A second terminal allocated with a DQT2 703 may perform the collision detection in the channel prior to the other terminals excluding the first terminal.

A plurality of quiet time slots 704 and 711, excluding the allocated DQT1 702 and the DQT2 703, may be allocated to third terminals having a relative low priority order. For example, the third terminals may be allocated with any one of the quiet time slots 704 for the first CD period 700 to thereby perform the collision detection in the allocated quiet time slot. Also, the third terminals may be allocated with any one of the quiet time slots 711 that includes a quiet time slot QT 710 to thereby perform the collision detection in the allocated quiet time slot for a second CD period 710. Only for the first CD period 700 temporally prior to the second CD period 710, the quiet time slots DQT1 701 and DQT2 702 may be allocated.

A cognitive radio communication method may prevent a collision between terminals from occurring in a channel and thereby more effectively use radio resources even where terminals increase in a network. Also, since radio resources are allocated in priority order according to a terminal feature, a QoS may be guaranteed for a particular terminal. Also, the cognitive radio communication method may be compatible with an existing scheme and thereby be readily embodied at low costs.

A cognitive radio communication method may prevent a collision between terminals from occurring in a channel. Through this, even where terminals increase in a network, the cognitive radio communication method may more effectively use radio resources.

A cognitive radio communication method may allocate radio resources according to a terminal feature and thereby guarantee a QoS.

A cognitive radio communication method may interact with an existing scheme and thereby may be embodied at low costs.

The methods described above including the cognitive radio communication method may be recorded, or fixed in one or more computer-readable media that includes program instructions to be implemented by a computer to cause a processor to execute or perform the program instructions. The media may also include, independent of or in combination with the program instructions, data files, data structures, and the like. Examples of computer-readable media may include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the methods and/or operations described above.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A cognitive radio communication terminal comprising:
   a transmission processing unit to divide data by a quiet time slot that is allocated at a first point in time of a collision detection period, and to transmit at least one portion of the divided data to a reception side, wherein the collision detection period is divided into a plurality of uniformly sized time slots and the quiet time slot is one of the uniformly sized time slots; and
   a sensing unit to determine whether at least one of feature information and an energy of another terminal is detected in a channel with the reception side during the quiet time slot of the first point in time,
   wherein, where neither the feature information nor the energy of the other terminal is detected based on a determination of the sensing unit, the transmission processing unit transmits the remaining divided data.

2. The cognitive radio communication terminal of claim 1, wherein, where only the energy of the other terminal is detected in the channel with the reception side based on the determination of the sensing unit, the transmission processing unit transmits the feature information to the reception side during the collision detection period, and occupies the channel with the reception side after the collision detection period to transmit the remaining divided data.

3. The cognitive radio communication terminal of claim 2, wherein the other terminal detects the feature information in a quiet time slot, allocated at a second point in time of the collision detection period, to suspend transmission of the data in correspondence to a detection of the feature information.

4. The cognitive radio communication terminal of claim 3, wherein the first point in time is temporally prior to the second point in time.

5. The cognitive radio communication terminal of claim 1, wherein, where both the feature information and the energy of the other terminal are detected in the channel with the reception side based on the determination of the sensing unit, the transmission processing unit suspends transmission of the divided data.

6. The cognitive radio communication terminal of claim 1, wherein the sensing unit determines whether at least one of the feature information and the energy is detected in the channel with the reception side using an energy detection scheme or a feature detection scheme in the quiet time slot of the first point in time.

7. The cognitive radio communication terminal of claim 6, wherein the feature detection scheme is performed depending on whether at least one feature information among a preamble, a pilot, a signature, and a cyclic prefix is detected in the channel with the reception side.

8. The cognitive radio communication terminal of claim 1, wherein:
   the transmission processing unit divides the remaining divided data by a quiet time slot allocated at a third point in time of a subsequent collision detection period,
   the sensing unit determines whether at least one of the feature detection and the energy of the other terminal is detected in the channel with the reception side in the quiet time slot of the third point in time, and
   where neither the feature information nor the energy of the other terminal is detected based on the determination at the third point in time, the transmission processing unit transmits the remaining divided data at the third point in time.

9. The cognitive radio communication terminal of claim 8, wherein, where only the energy of the other terminal is detected based on the decision result at the third point in time, the transmission processing unit transmits the feature information to the channel with the reception side by the subsequent quiet collision period, and occupies the channel with the reception side after the subsequent collision detection period to transmit the remaining divided data.

10. The cognitive radio communication terminal of claim 9, wherein the other terminal detects the feature information in a quiet time slot allocated at a fourth point in time of the subsequent collision detection period and suspends transmission of data in correspondence to detection of the feature information, and the third point in time is temporally prior to the fourth point in time.

11. The cognitive radio communication terminal of claim 8, wherein, where both the feature detection and the energy of the other terminal are detected based on the decision result at the third point in time, the transmission processing unit suspends transmission of the divided data.

12. The cognitive radio communication terminal of claim 1, wherein at least one of the time slots is assigned with a priority order and is allocated to a particular terminal as a quiet time slot of the particular terminal.

13. The cognitive radio communication terminal of claim 12, wherein:
   the priority order corresponds to a channel service, and
   a temporally foreground time slot among the plurality of time slots is allocated to the particular terminal needing a Quality of Service (QoS) as a top priority.

14. The cognitive radio communication terminal of claim 1, further comprising:
   a receiver to receive an acknowledgement signal from the reception side, where reception of the divided data is completed.

15. The cognitive radio communication terminal of claim 1, wherein the sensing unit determines whether at least one of feature information and the energy of another terminal is detected in the channel with the reception side during the quiet time slot of the first point in time of the collision detection period.

16. The cognitive radio communication terminal of claim 1, wherein the quiet time slot is randomly allocated the first point in time of the collision detection period.

17. The cognitive radio communication terminal of claim 1, wherein the cognitive radio communication terminal is included in a group of terminals, and each terminal in the group is randomly allocated a quiet time slot in the collision detection period.

18. A cognitive radio communication method for a cognitive radio communication terminal, the method comprising:
transmitting data during a collision detection period;
suspending transmission of the data at a quiet time slot that is allocated at a first point in time of the collision detection period to determine whether at least one of feature information and the energy of another terminal is detected in a channel with a reception side, wherein the collision detection period is divided into a plurality of uniformly sized time slots and the quiet time slot is one of the uniformly sized time slots; and
resuming transmission of the data where the feature information or the energy of the other terminal is not detected in the channel with the reception side.

19. The method of claim 18, wherein, where only the energy of the other terminal is detected in the channel with the reception side, the method further comprises:
transmitting the feature information to the channel with the reception side by the collision detection period; and
occupying the channel with the reception side after the collision detection period to transmit the remaining data.

20. The method of claim 18, further comprising:
suspending transmission of the data where the feature detection and the energy of the other terminal is detected in the channel with the reception side based on the decision result.

21. The method of claim 18, further comprising:
receiving an acknowledgement signal from the reception side where transmission of the data is completed.

22. A non-transitory computer-readable recording medium storing a program to perform a cognitive radio communication terminal, comprising instructions to cause a computer to:
transmit data during a collision detection period;
suspend transmission of the data at a quiet time slot that is allocated at a first point in time of the collision detection period to determine whether at least one of feature information and the energy of another terminal is detected in a channel with a reception side, wherein the collision detection period is divided into a plurality of uniformly sized time slots and the quiet time slot is one of the uniformly sized time slots; and
resume transmission of the data where the feature information or the energy of the other terminal is not detected in the channel with the reception side.

* * * * *